May 26, 1959 — M. BENSON — 2,888,083
OVERLOAD SAFETY DEVICE
Filed March 31, 1958 — 2 Sheets-Sheet 1

INVENTOR.
MARVIN BENSON
BY
Howard M Herriot
ATTY.

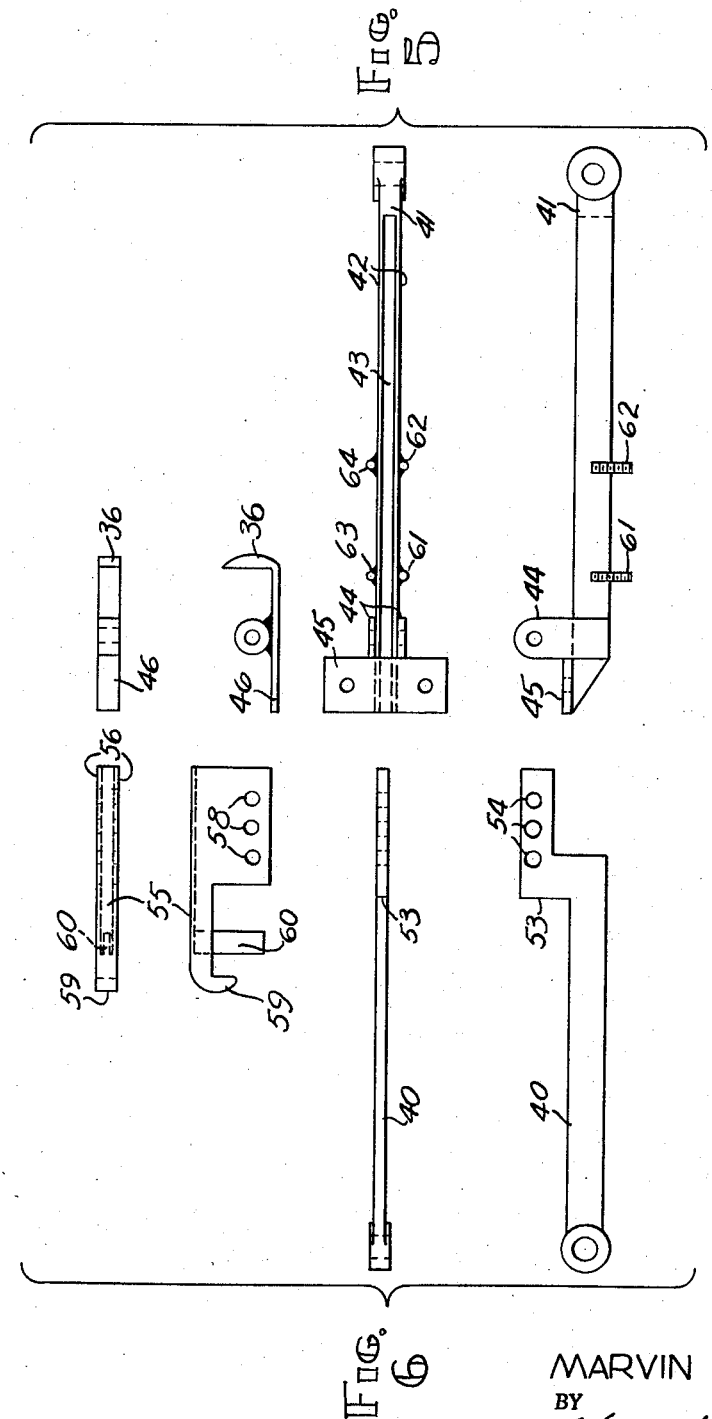

2,888,083

OVERLOAD SAFETY DEVICE

Marvin Benson, Cambridge, Wis.

Application March 31, 1958, Serial No. 724,969

6 Claims. (Cl. 172—3)

This invention relates to overload safety devices for tractors and implements drawn by tractors. The invention refers more particularly to a safety device which, upon the occurrence of an overload caused by the plow or other implement striking an obstruction, causes the implement to tip or swing upwardly away from the obstruction and causes the clutch of the tractor to be disengaged.

Overload safety devices of the prior art have been complex and expensive and not satisfactorily protective of the operator and equipment.

It is therefore an object of this invention to provide an extremely reliable overload safety device which, upon the occurrence of an overload, causes the plow to swing up and the tractor clutch to be released, thereby protecting both operator and equipment.

It is also an object of this invention to provide such an overload safety device which is simple and inexpensive.

Another object of this invention is to provide such a device which stops the tractor smoothly without jolting the operator.

A further object of the invention is to provide an overload safety device which can easily be finely adjusted so that it may initiate the performance of its functions at any desired value of overload within a predetermined range.

Still another object of the invention is to provide an overload safety device which, upon the occurrence of an overload, disengages the tractor's clutch and locks the clutch in disengaged position.

It is an additional object of this invention to provide an overload safety device as above described in which an adjustment may be made to adjust the angle of approach of the plow.

Objects and advantages other than those above set forth will be apparent from the following description when read in conjunction with the accompanying drawings, in which:

Fig. 5 illustrates two parts of the hitch assembly shown in Figs. 2, 3, and 4, showing each part in side and plan views.

Fig. 6 illustrates two other parts of the hitch assembly shown in Figs. 2, 3, and 4, showing each part in side and plan views.

Figure 1:
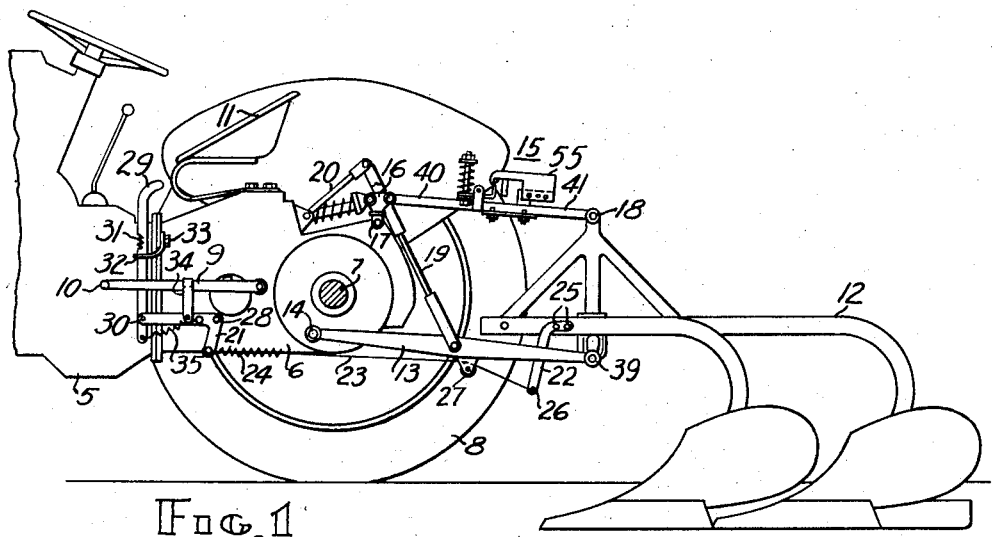
Fig. 1 is a side view, partly in section, of the rear portion of a tractor with a plow attached thereto, illustrating an application of this invention, and showing the parts in their position before the occurrence of an overload.

Referring to the drawings, in which like numerals indicate like parts, the numeral 5 designates generally a tractor which includes a rear differential housing 6, which may be considered part of the tractor chassis. The rear axle 7 is journalled in this differential housing and, as is customary, mounts the traction wheels 8, only one of which is shown.

The clutch (not shown) by which the transmission of driving force to the traction wheels is controlled, is arranged to be disengaged by depression of clutch pedal 9 which projects from the side of the differential housing 6 and extends forwardly to have its treadle portion 10 readily accessible to the foot of an operator seated on the seat 11.

The implement to be drawn by the tractor, such as plow 12, is connected to the tractor by drawbar 13 which is pivotably connected as at 14 to the differential housing of the tractor and is pivotable connected at swivel 39 to the frame of the plow. The plow frame standard is connected to the tractor by hitch assembly 15, which will be described hereinafter. Hitch assembly 15 is connected at its forward end to the tractor through a T-lever 16 which is pivoted to the differential housing as at 17. The rearward end of hitch assembly 15 is pivotably connected to the plow frame standard as at 18.

A hydraulic lift mechanism (not shown) may raise and lower the implement, the raising and lowering force being applied to the drawbar 13 through a tie rod arrangement, parts of which are shown at 19 and 20.

The plow frame is connected through a linkage comprising piece 22, cable 23, and spring 24 to a generally L-shaped clutch control member 21. The piece 22 is rigidly connected at its upper end to the plow frame as at 25. The cable 23 is connected at its rearward end to piece 22 at the lower end thereof as at 26, and the cable rides over pulley or roller 27 attached to drawbar 13. Cable 23 is connected at its forward end to the rearward end of spring 24, which at its forward end is connected to the rearward and lower end of clutch control member 21.

The hitch assembly 15 comprises a tractor link 40 and a plow link 41. Plow link 41 has a pair of sides 42 spaced apart to define a groove 43 which receives tractor link 40 allowing the two links 40, 41 to have relative movement in telescopic arrangement. A floor plate 37 is removable mounted on link 41 by threaded rods 61, 62, 63, 64 which are attached to sides 42 and extend through holes in floor plate 37. Nuts 71, 72, 73, 74, for threaded rods 61, 62, 63, 64, removably secure the floor plate 37 to link 41. Mounting platform 45 and floor plate 37 act as roof and floor guides respectively, to insure maintenance of axial alignment of links 40, 41 as they telescope either together or apart. Floor plate 37, being removably attached to link 41, affords easy assembly and disassembly of links 40, 41.

Fixedly attached at the forward or inner end of plow link 41 are a pair of mounting posts 44 and a mounting platform 45 for mounting a spring loaded latch member 46. Latch member 46 has an upwardly turned catch 36 at its rearward or inner end and has a hole through its central portion. The latch member is pivotably connected to the mounting posts by a bolt 47 passing through the hole in the latch member and the holes in the mounting posts. The forward or outer end of latch member 46 extends over mounting platform 45. A plate 48 is disposed over the forward end of latch member 46 and loading springs 49 are disposed between the plate 48 and washers 50. The loading springs are coiled about bolts 51 which pass through holes in platform 45 and plate 48. Nuts 52 provide a fine adjustment of the force which loading springs 49 exert downwardly on the forward end of latch member 46. It is thus seen that any force tending to depress catch 36 of latch member 46 is opposed by the force exerted by loading springs 49.

Tractor member 40 has at its rearward or inner end an upwardly offset mounting portion 53 having a plurality of holes 54 therethrough. A latch holder 55, having spaced apart sides 56 which slip over mounting portion 53, is pivotably mounted on mounting portion 53 by a bolt 57. The bolt passes through one of the three holes 54 in the mounting portion and one of the three pairs of holes 58 in the sides 56 of the latch holder 55. Extending down from the forward or inner portion of latch holder 55 are catch 59 and a stop piece 60 for receiving in the space therebetween the catch 36 of spring loaded latch member 46. The hitch assembly 15 and the above mentioned parts thereof are positioned and dimensioned to provide room for catch 36 to pass under catch 59, between link 41 and catch 59 in the separating-unlatching and the resetting-latching operations hereinafter described.

Figure 2:
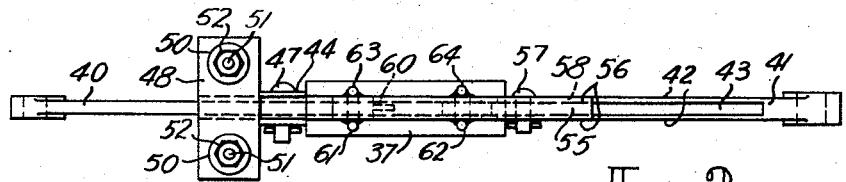
Fig. 2 is a top plan view of the hitch assembly portion of the device shown in Fig. 1, the parts being shown in their position before the occurrence of an overload.
Figure 3:
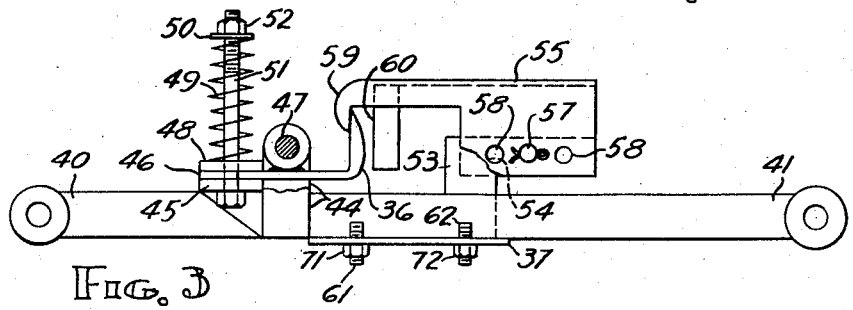
Fig. 3 is a side view, partly in section, of the hitch assembly portion of the device shown in Fig. 1, the parts being shown in their position before the occurrence of an overload.

During plowing, under normal conditions, the tractor pulls on drawbar 13 to urge the plow through the ground as is illustrated in Fig. 1, the parts being positioned as shown in Figs. 1, 2, and 3. As the plowshares initially engage the soil, the plow tips up, pivoting about swivel 39 moving plow link 41 a slight distance forwardly over tractor link 40 until the flat surface of catch 36 engages the flat surface of catch 59. This engagement, being above pivot bolt 47, tends to depress catch 36, but unless the force reaches overload magnitude, the springs 49 resist the depression of catch 36 sufficiently to prevent same. The tip up or swinging action of the plow is thus stopped, under normal loading conditions, by the engagement of catches 36 and 59. The hitch 15 thus maintains links 40, 41 in locked or latched relation, and therefore the plow, even though tending to tip up further, is held in its desired ground engaging position.

Figure 4:
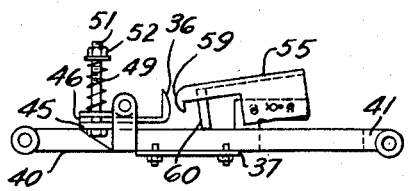
Fig. 4 is a side view of the hitch assembly portion, illustrating the position of the parts after the occurrence of an overload.

If an overload occurs, however, as for example when the plow strikes an obstruction in the earth such as a stone or root, the depressing force that catch 59 exerts on catch 36 becomes great enough to overcome the depression-resisting force exerted by loading springs 49, and catch 36 is thus depressed and it clears catch 59. Latch member 46 and latch holder 55 thus separate and the hitch 15 is unlatched. The plow is now free to swing up and it does swing up, and as illustrated in Fig. 4, plow link 41 has telescopically moved a considerable distance forwardly relative to tractor link 40 as the plow tipped up, swinging about pivot 39, thus moving the plowshares away from the root, stone, or other obstruction.

As the plow swings up, piece 22 dips down and pulls cable 23 rearwardly. Clutch control member 21 is thus moved counterclockwise about its pivot point 28. Hooked link 34 therefore pulls down clutch pedal 9 to release the clutch, thus removing the power from the traction wheels. The tractor stops very smoothly and without jolting the operator.

Clutch control member 21 simultaneously pulls clutch handle 29 down through the slot in bracket 32, and because of the urging action of spring 35, the clutch handle, at one of the notches 31, engages bracket 32 to lock the clutch handle and thus the clutch pedal in the released position. The operator may thus leave the tractor to remove or otherwise deal with the obstruction in the ground without fear of the tractor starting up.

The precise overload magnitude or value at which the device initiates the above described operation may easily be selected by adjustment of nuts 52 to vary the force exerted on latch member 46 by springs 49.

It is thus seen that, upon the occurrence of an overload of a predetermined adjustable value, the plow is caused to tip up, swinging about its pivot to take the plowshares away from the obstruction and to release and lock the tractor clutch, thus preventing damage to plow and tractor and preventing injury to the operator and any bystanders.

The device may be reset to again continue normal plowing by engaging the clutch and raising the plow with the hydraulic lift mechanism. Pulling up the clutch handle unlocks and resets the clutch pedal and the clutch control member 21. Raising the plow through rods 19, 20 causes the hitch assembly to reset in the following manner. Starting from the position shown in Fig. 4, the plow link 41 moves rearwardly relative to tractor link 40 and thus the curved surfaces of catches 36, 59 engage, causing latch holder 55 to pivot, swinging its forward end up. Catch 59 rides up and over catch 36. After catch 36 has passed under catch 59, latch holder 55 swings back down in position such as shown in Figs. 1, 2, and 3. Catch 36 hits stop piece 60 to stop the rearward movement of plow link 41 relative to tractor link 40. Catch 36 is now again positioned between catch 59 and stop piece 60. The hitch is now reset and the plow may be lowered with the hydraulic mechanism so that plowing may again be resumed. The overload safety device is now again ready to respond in the event of another obstruction or other overload causing condition.

By varying the mounted position of the latch holder 55 on mounting portion 53, the plow's angle of approach to the ground may be varied. The latch holder 55 is shown with its three pairs of holes 58 aligned with the three holes 54 in mounting portion 53. Four other positions are possible, however. The rear or right holes 58 of latch holder 55 may be aligned with the forward or left hole 54 of mounting portion 53. The forward holes 58 may be aligned with center hole 54. The rear holes 58 may be aligned with the center hole 54. The forward holes 58 may be aligned with rear hole 54. Adjusting the mounted position of latch holder 55 on mounting portion 53 adjusts the amount of latched position overlap of plow link 41 and tractor link 40, and thus adjusts the length of the entire plow hitch assembly from the connection on the tractor to the connection on the plow frame. The plow frame may in this manner be swingingly adjusted about pivot 39 to different positions thereby adjusting the plow's angle of approach to the soil or through the soil.

With the fine adjustment of the force of loading springs 49 and the plow angle adjustment just described, the tractor and plow, because of the plow hitch and link device of this invention, may be suited to a wide variety of different soil conditions merely by making these easy and effective adjustments provided by the hitch assembly.

The device herein shown and described has, in operation of actual models thereof, exhibited surprisingly superior performance as to smooth and non-jolting release when compared to all the prior art devices.

The device as illustrated may readily be used on tractors such as the Fordson and with very little adaptation can be used on Ford, Ferguson and most other types of tractors.

This invention provides an improved safety device which is convenient, safe, reliable, simple, inexpensive, and surprisingly smooth and non-jolting in its operation.

Although only one embodiment of the invention has been illustrated and described, it will be obvious to those skilled in the art that various changes or modifications may be made without departing from the spirit of the invention or from the scope of the appended claims.

This application is a continuation-in-part of application Serial Number 434,603 filed June 4, 1954, now abandoned.

It is claimed and desired to secure by Letters Patent:

1. In an overload safety device for a tractor having a drawbar attached thereto and a plow pivotably attached to said drawbar, a hitch comprising a plow link having a groove therein and attached at its rearward end to said plow, a latch pivotably mounted on the forward end of said plow link, said latch having an upwardly extending catch at its rearward end, spring means depressing the forward end of said latch for resisting depression of said catch, a tractor link attached at its forward end to said tractor and disposed in said groove for telescopic action with said plow link, a latch holder pivotably mounted on the rearward end of said tractor link and engageable with said catch tending to depress said catch but normally holding said links latched in a fixed position of predetermined overlap, said latch holder depressing said catch in response to a predetermined overload for unlatching said links from said fixed position to cause said plow to swing about said drawbar to telescopically move said plow link over said tractor link to a position of a substantially greater amount of overlap, a bracket mounted on said tractor and having a slot therein, a clutch handle on said tractor having a notch therein and extending through said slot, a linkage including an L-shaped control member pivotably mounted on said tractor responsive to the swinging movement of said plow for disengaging the clutch and for moving said clutch handle through said slot to lockingly engage said clutch handle with said bracket at said notch to lock the clutch in disengaged position.

2. In an overload safety device for a tractor having a drawbar attached thereto and a plow pivotably attached to said drawbar, a hitch comprising a plow link attached at its rearward end to said plow, a latch pivotably mounted on the forward end of said plow link, said latch having an upwardly extending catch at its rearward end, spring means depressing the forward end of said latch for resisting depression of said catch, a tractor link attached at its forward end to said tractor and disposed for telescopic action with said plow link, and a latch holder pivotably mounted on the rearward end of said tractor link and engageable with said catch tending to depress said catch but normally holding said links latched in a fixed position of a predetermined overlap, said latch holder depressing said catch in response to a predetermined overload for unlatching said links from said fixed position to cause said plow to swing about said drawbar to telescopically move said plow link over said tractor link to a position of a substantially greater amount of overlap than said predetermined amount of overlap.

3. In an overload safety device for a tractor having a drawbar attached thereto and a plow pivotably attached to said drawbar, a hitch comprising a plow link attached at its rearward end to said plow, a latch pivotably mounted on the forward end of said plow link, said latch having an upwardly extending catch at the rearward end, spring means depressing the forward end of said latch for resisting depression of said catch, a tractor link attached at its forward end to said tractor and disposed for telescopic action with said plow link, a latch holder pivotably mounted on the rearward end of said tractor link and engageable with said catch tending to depress said catch but normally holding said links latched in a fixed position of a predetermined overlap, said latch holder depressing said catch in response to a predetermined overload for unlatching said links from said fixed position to cause said plow to swing about said drawbar to telescopically move said plow link over said tractor link to a position of greater overlap than said predetermined overlap, and means responsive to the swinging movement of said plow for lockingly disengaging the clutch of said tractor.

4. In an overload safety device for a tractor having a drawbar attached thereto and a plow pivotably attached to said drawbar, a hitch comprising a tractor link attached to said tractor, a plow link attached to said plow and telescopically movable over said tractor link, a spring loaded latch pivotably mounted on one of said links, a latch holder mounted on the other of said links and engageable with said latch tending to disengage said latch and latch holder but normally staying in engagement to hold said links in fixed relation of a predetermined amount of overlap, said latch holder pivoting said latch thereby disengaging said latch and latch holder in response to a predetermined overload for causing said plow to swing about said drawbar to telescopically move said plow link over said tractor link to a position of substantially greater amount of overlap than said predetemined amount of overlap, and means responsive to the swinging movement of said plow for disengaging the clutch of said tractor.

5. In an overload safety device for a tractor having a drawbar attached thereto and a plow pivotably attached to said drawbar, a hitch comprising a tractor link attached to said tractor, a plow link attached to said plow and telescopically movable over said tractor link, a spring loaded latch pivotably mounted on one of said links, a latch holder mounted on the other of said links, said latch and latch holder normally latching said links in fixed relation but responsive to a predetermined overload for pivoting said latch, unlatching said links and causing said plow to swing about said drawbar to telescopically move said plow link over said tractor link, and means responsive to the swinging movement of said plow for disengaging the clutch of said tractor.

6. In an overload safety device for a tractor having a drawbar attached thereto and a plow pivotably attached to said drawbar, a hitch comprising a tractor link attached to said tractor, a plow link attached to said plow and telescopically movable over said tractor link, a spring loaded latch pivotably mounted on one of said links, and a latch holder pivotably mounted on the other of said links, said latch and latch holder normally latching said links in fixed relation but responsive to a predetermined overload for pivoting said latch to unlatch said links allowing said plow to swing about said drawbar and telescopically move said plow link forwardly over said tractor link, and thereafter responsive to reaward movement of said plow link over said tractor link for pivoting said latch holder to relatch said latch and latch holder for resetting said hitch.

References Cited in the file of this patent

UNITED STATES PATENTS

| | | |
|---|---|---|
| 1,365,299 | Blumberg et al. | Jan. 11, 1921 |
| 2,294,188 | Kuntz | Aug. 25, 1942 |
| 2,405,980 | Sands et al. | Aug. 20, 1946 |
| 2,573,221 | Romig | Oct. 30, 1951 |
| 2,659,288 | Vanderloop | Nov. 17, 1953 |
| 2,712,279 | Altgelt et al. | July 5, 1955 |